(12) United States Patent
Neumeier

(10) Patent No.: US 10,820,049 B2
(45) Date of Patent: Oct. 27, 2020

(54) TECHNIQUES FOR AUDIENCE ANALYSIS USING AUTOMATED CONTENT RECOGNITION AND IDENTITY MANAGEMENT

(71) Applicant: INSCAPE DATA, INC., Irvine, CA (US)

(72) Inventor: Zeev Neumeier, Berkeley, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 16/369,475

(22) Filed: Mar. 29, 2019

(65) Prior Publication Data

US 2019/0306570 A1 Oct. 3, 2019

Related U.S. Application Data

(60) Provisional application No. 62/651,401, filed on Apr. 2, 2018.

(51) Int. Cl.
*H04N 21/442* (2011.01)
*H04N 21/658* (2011.01)
*H04N 21/466* (2011.01)
*H04N 21/845* (2011.01)

(52) U.S. Cl.
CPC ... *H04N 21/44204* (2013.01); *H04N 21/4667* (2013.01); *H04N 21/6582* (2013.01); *H04N 21/8456* (2013.01)

(58) Field of Classification Search
CPC ......... H04N 21/44204; H04N 21/4667; H04N 21/6582; H04N 21/8456
See application file for complete search history.

(56) References Cited

U.S. PATENT DOCUMENTS

| | | | |
|---|---|---|---|
| 8,255,949 B1* | 8/2012 | Bayer | G06Q 30/0241 725/32 |
| 2009/0299843 A1* | 12/2009 | Shkedi | H04N 21/812 705/14.25 |
| 2017/0311035 A1* | 10/2017 | Lewis | G06F 16/24578 |
| 2019/0205373 A1* | 7/2019 | Walsh | G06F 16/9535 |

\* cited by examiner

*Primary Examiner* — Sumaiya A Chowdhury
(74) *Attorney, Agent, or Firm* — Polsinelli LLP

(57) ABSTRACT

The present disclosure relates generally to media content distribution, and more particularly to audience analysis using automated content recognition and identity management. In certain embodiments, a targeting system is provided for generating and presenting a user interface to assist an administrator in targeting particular users. For example, a user interface (referred to as an audience explorer) may be presented that allows the administrator to select one or more categories of users. For another example, a user interface (referred to as a genre explorer) may be presented to that allows the administrator to select a particular media category. For another example, a user interface (referred to as a show explorer) may be presented that allows the administrator to select a particular media segment. For another example, a user interface (referred to as a station explorer) may be presented that allows the administrator to select a particular content stream.

20 Claims, 12 Drawing Sheets

TECHNIQUES FOR AUDIENCE ANALYSIS USING AUTOMATED CONTENT RECOGNITION AND IDENTITY MANAGEMENT

CROSS-REFERENCE TO RELATED APPLICATIONS

This application claims the benefit of U.S. Provisional Application No. 62/651,401, filed Apr. 2, 2018, which is hereby incorporated by reference in its entirety.

FIELD

The present disclosure relates generally to media content distribution, and more particularly to audience analysis using automated content recognition and identity management.

BACKGROUND

Managing dense datasets provides significant challenges. For example, there are difficulties in storing, indexing, and managing large amounts of data that is required for certain systems to function. One area in which such problems arise includes systems that search for and identify a closest match between data using reference data stored in large datasets. In addition, calculation of metrics based on matched data may be difficult due to the large datasets.

SUMMARY

In certain embodiments, a targeting system is provided for generating and presenting a user interface to assist an administrator in targeting particular users. For example, a user interface (referred to as an audience explorer) may be presented that allows the administrator to select one or more categories of users. In response to selection of a category, the audience explorer may output a percent that users in the category are more or less likely to view a particular content stream than the rest of a population. The percent may be calculated based upon a correlation between categorization data and viewing behavior data. The categorization data may include a plurality of sets, each set including a category and at least one media consuming devices assigned to the category. The viewing behavior data may identify media content presented by a media consuming device associated with a set of the plurality of sets. The audience explorer may also output a percent of users that are assigned to the category that have viewed the particular content stream.

For another example, a user interface (referred to as a genre explorer) may be presented that allows the administrator to select a particular media category. In response to selection of the genre, the genre explorer may output a percent that users in a category are more or less likely to view media of the particular genre than the rest of a population (calculated similarly to as described above for the audience explorer). The genre explorer may also output a percent of users that are assigned to the category that have viewed media of the particular genre.

For another example, a user interface (referred to as a show explorer) may be presented that allows the administrator to select a particular media segment. In response to selection of the particular media segment, the show explorer may output a percent that users in a category are more or less likely to view the particular media segment than the rest of a population (calculated similarly to as described above for the audience explorer). The show explorer may also output a percent of users that are assigned to the category that have viewed the particular media segment.

For another example, a user interface (referred to as a station explorer) may be presented that allows the administrator to select a particular content stream. In response to selection of the particular content stream, the station explorer may output a percent that users in a category are more or less likely to view the particular content stream than the rest of a population (calculated similarly to as described above for the audience explorer). The show explorer may also output a percent of users that are assigned to the category that have viewed the particular content stream.

According to embodiments described above, techniques may be provided for outputting a viewing metric for use in determining a time to send content to one or more media consuming devices. For example, techniques may include receiving categorization data and viewing behavior data. The categorization data may include a plurality of sets, where a set includes a category and a group of one or more media consuming devices assigned to the category. The viewing behavior data may identify media content presented by a media consuming device associated with a set of the plurality of sets. In some examples, a first set of the plurality of sets includes a first media consuming device and a second set of the plurality of sets includes a second media consuming device. In such examples, the first media consuming device may be a different device than the second media consuming device. In some examples, the viewing behavior data may be determined by matching unidentified media content viewed by a media consuming device with identified media content. The categorization data may be connected to the viewing behavior data to generate connected data.

In some examples, interaction data may also be received. The interaction data may indicate an interaction with a website by a data consuming device (e.g., a media consuming device) included in the categorization data. In such examples, the viewing behavior data used to generate the connected data may be based on the data consuming device with a particular interaction with the website.

At some point, either before or after the connected data is generated, input corresponding to a request for a viewing metric may be received. In some examples, the request for the viewing metric may be associated with a plurality of categories included in the categorization data. The viewing metric may be associated with a particular category included in the categorization data, where the particular category has been connected to particular viewing behavior data.

In some examples, a second input may be received. The second input may correspond to a request for a viewing metric associated with a second category included in the categorization data, where the second category has been connected with second particular viewing behavior data. In such examples, the viewing metric may be updated using the connected data and the second particular viewing behavior data, where the updating is performed in real time in response to receiving the second input. After the viewing metric is updated, it may be output for use in determining a time to send content to one or more media consuming devices.

Using the particular viewing behavior data, the viewing metric may be calculated for the particular category. In some examples, calculating the viewing metric may be based on time spent by media consuming devices in the particular category watching one or more video segments, time spent by media consuming devices watching the one or more video segments, or a number of media consuming devices that watched the one or more video segments. Examples of a viewing metric include a channel that is most watched by one or more data consuming devices in the particular category, a video segment that is most watched by one or more data consuming devices in the particular category, or a time channel pair that is most watched by one or more data consuming devices in the particular category. The viewing metric may then be output for use in determining a time to send content to one or more media consuming devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to media content distribution, and more particularly to audience analysis using automated content recognition and identity management. In certain embodiments, a targeting system is provided for generating and presenting one or more user interfaces to assist an administrator in targeting particular users, as further described below.

Figure 1:
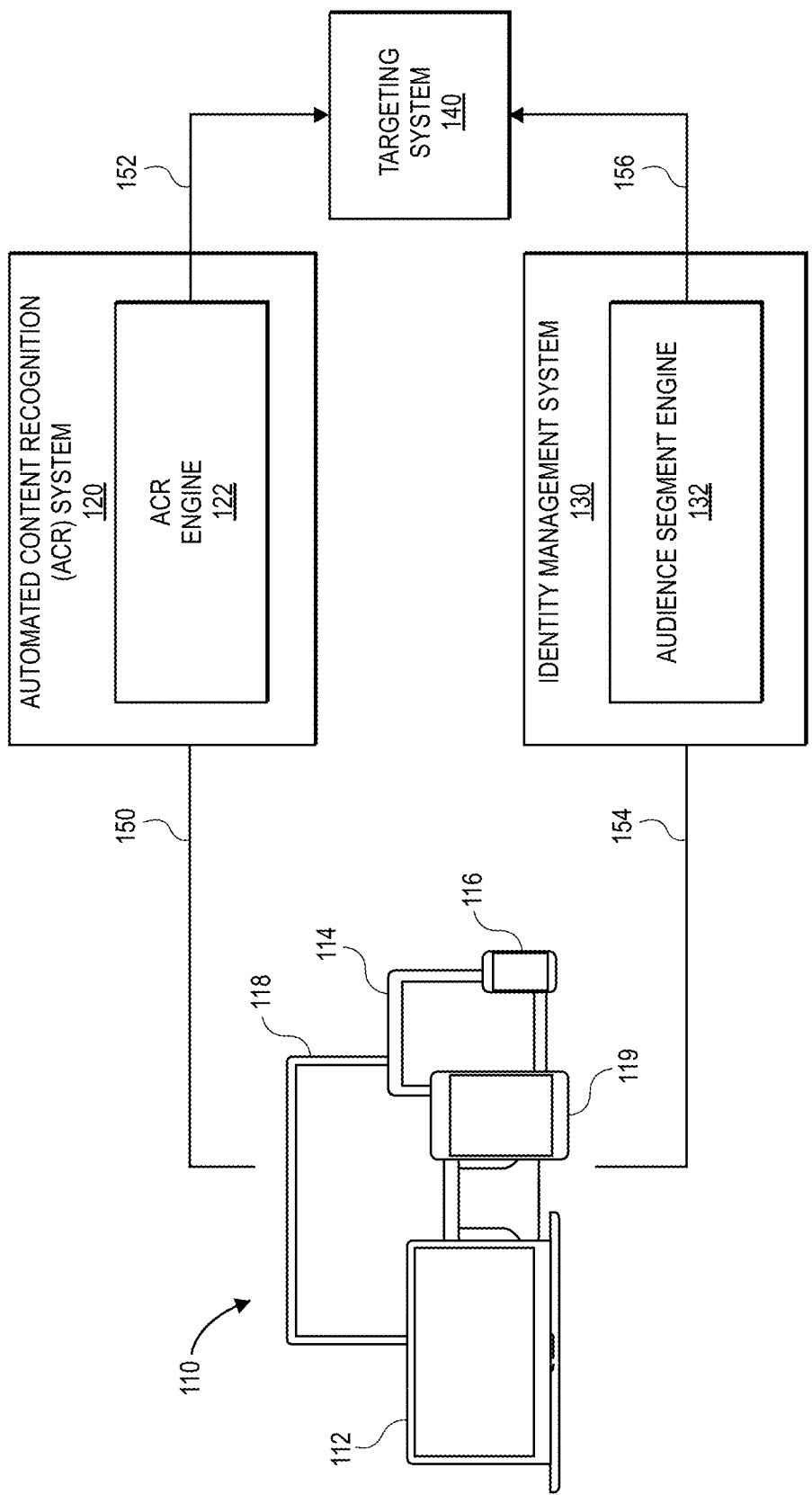
FIG. 1 depicts a distributed environment according to certain embodiments.

FIG. 1 depicts a distributed environment according to certain embodiments. The distributed environment includes media consuming devices 110, automated content recognition system 120, identity management system 130, and targeting system 140. However, the distributed system is merely an example and is not intended to unduly limit the scope of inventive embodiments recited in the claims. One of ordinary skill in the art would recognize many possible variations, alternatives, and modifications. For example, in some implementations, a distributed system may have more or fewer systems than those shown in FIG. 1, may combine two or more systems, or may have a different configuration or arrangement of systems. For another example, while the distributed environment includes a particular number of media consuming devices 110, the distributed environment may include more or less media consuming devices.

Media consuming devices 110 may be configured to receive and present content. Examples of media consuming devices include laptop 112, tablet 114, smart phone 116, television 118, eBook reader 119, or the like. Each media consuming device of media consuming devices 110 may be communicatively coupled to one or more remote systems (e.g., automated content recognition (ACR) system 120, identity management system 130, or other system) via one or more communication networks. Examples of communication networks include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate communications including both wired and wireless protocols such as IEEE 802.XX suite of protocols, TCP/IP, IPX, SAN, AppleTalk®, Bluetooth®, Infini-Band, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

Using the one or more communication networks, a media consuming device may send data to the one or more remote systems. The data may be related to content received, presented, and/or generated by the media consuming device. For example, the media consuming device may receive media content (such as a video segment). The media consuming device may extract pixel data from the media content. Based upon the pixel data, the media consuming device may generate a summary of one or more frames of the media content (sometimes referred to as a pixel cue point, as further described below regarding FIG. 2).

The media consuming device may send the summary to ACR system 120 (as illustrated by reference 150) so that ACR system 120 may identify the media content using ACR engine 122. In some examples, after identifying the media content, ACR engine 122 may send a pairing of the media consuming device (that sent the pixel cue point to ACR engine 122) and the identification of the media content to targeting system 140 (as illustrated by reference 152). In other examples, ACR engine 122 may send multiple pairings to targeting system 140 at a time.

While there are many ways that media content may be identified, one method (described in more detail below with respect to FIG. 2) may include receiving a pixel cue point associated with a frame of an unknown video segment. In some examples, the pixel cue point may include a set of pixel values corresponding to the frame. The method may further include identifying a candidate reference data point in a database of reference data points. In some examples, the candidate reference data point may be similar to the pixel cue point. In such examples, the candidate reference data point may include one or more pixel values corresponding to a candidate frame of a candidate video segment. The method may further include adding a token to a bin associated with the candidate reference data point and the candidate video segment and determining whether a number of tokens in the bin exceeds a value. The method may further include identifying the unknown video segment as matching the candidate video segment when the number of tokens in the bin exceeds the value.

Figure 2:
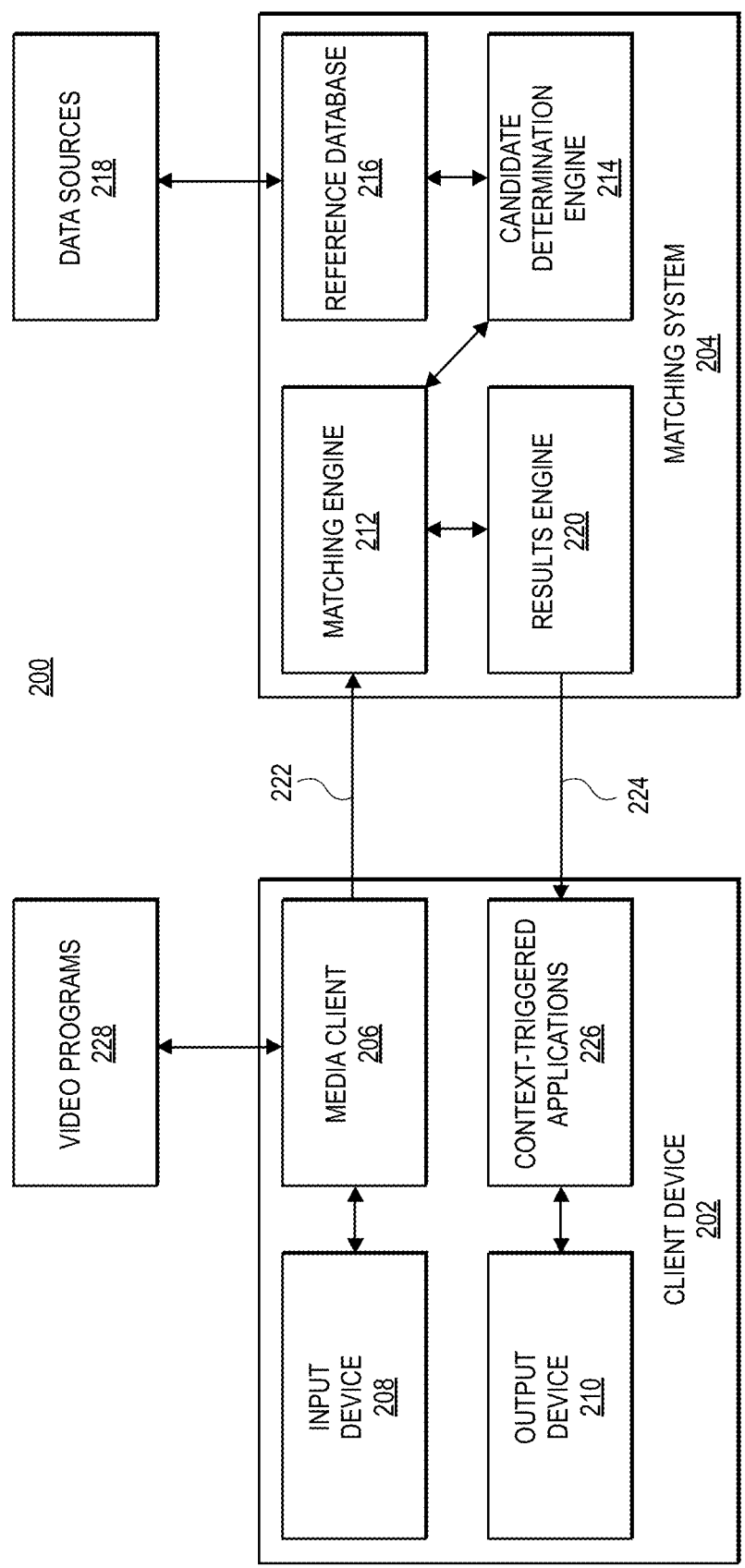
FIG. 2 depicts an example of a matching system according to certain embodiments.

FIG. 2 depicts an example of a matching system 204 (e.g., ACR system 120) according to certain embodiments. Matching system 204 may identify unknown content being viewed by client device 202 (e.g., media consuming devices 110).

Client device 202 may include media client 206, input device 208, output device 210, and one or more contextual applications 226. Media client 206 (which may be a television system, a computer system, or other electronic device capable of connecting to the Internet) may decode data (e.g., broadcast signals, data packets, or other frame data) associated with video programs 228. Media client 206 may place the decoded contents of each frame of the video into a video frame buffer in preparation for display or for further processing of pixel information of the video frames. In some examples, client device 202 may be any electronic decoding system that can receive and decode a video signal. Client device 202 may receive video programs 228 and store video information in a video buffer (not shown). Client device 202 may process the video buffer information and produce unknown data points (which can be referred to as "cue points"). Media client 206 may transmit the unknown data points to matching server 204 for comparison with reference data points in reference database 216, which may be included in or remote from matching system 204.

Input device 208 may include any suitable device that allows a request or other information to be input to media client 206. For example, input device 208 may include a keyboard, a mouse, a voice-recognition input device, a wireless interface for receiving wireless input from a wireless device (e.g., from a remote controller, a mobile device, or other suitable wireless device), or any other suitable input device. Output device 210 may include any suitable device that can present or otherwise output information, such as a display, a wireless interface for transmitting a wireless output to a wireless device (e.g., to a mobile device or other suitable wireless device), a printer, or other suitable output device.

Matching system 204 may begin a process of identifying a video segment by first collecting data samples from known video data sources 218. For example, matching system 204 may collect data to build and maintain reference database 216 from a variety of video data sources 218. Video data sources 218 may include media providers of television programs, movies, or any other suitable video source. Video data from video data sources 218 may be provided as over-the-air broadcasts, as cable TV channels, as streaming sources from the Internet, and from any other video data source. In some examples, matching system 204 may process the received video from video data sources 218 to generate and collect reference video data points in reference database 216, as described below. In some examples, video programs from video data sources 218 may be processed by a reference video program ingest system (not shown), which may produce the reference video data points and send them to reference database 216 for storage. The reference data points may be used as described above to determine information that is then used to analyze unknown data points.

Matching system 204 may store reference video data points for each video program received for a period of time (e.g., a number of days, a number of weeks, a number of months, or any other suitable period of time) in reference database 216. Matching server 204 may build and continuously or periodically update reference database 216 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) can be collected for each program source. Any number of program sources may be used to obtain video, such as 25 channels, 50 channels, 75 channels, 100 channels, 200 channels, or any other number of program sources.

Media client 206 may send communication 222 to matching engine 212 of the matching server 204. The communication 222 can include a request for matching engine 212 to identify unknown content. For example, the unknown content may include one or more unknown data points. Matching engine 212 may identify the unknown content by matching the unknown data points to reference data in reference database 216. In some examples, the unknown content may include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points may be derived from data received from video data sources 218. For example, data points may be extracted from the information provided from video data sources 218 and may be indexed and stored in reference database 216.

Matching engine 212 may send a request to candidate determination engine 214 to determine candidate data points from reference database 216. A candidate data point may be a reference data point that is a certain determined distance from the unknown data point. In some examples, a distance between a reference data point and an unknown data point may be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point may be the certain determined distance from an unknown data point when the pixels at each sample location are within a particular pixel value range.

In one illustrative example, a pixel value of a pixel may include a red value, a green value, and a blue value (in a red-green-blue (RGB) color space). In such an example, a first pixel (or value representing a first group of pixels) may be compared to a second pixel (or value representing a second group of pixels) by comparing the corresponding red values, green values, and blue values respectively, and ensuring that the values are within a certain value range (e.g., within 0-5 values). For example, the first pixel may be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. Candidate determination engine 214 may return the candidate data points to matching engine 212.

For a candidate data point, matching engine 212 may add a token into a bin that is associated with the candidate data point and that is assigned to an identified video segment from which the candidate data point is derived. A corresponding token may be added to all bins that correspond to identified candidate data points. As more unknown data points (corresponding to the unknown content being viewed) are received by matching server 204 from client device 202, a similar candidate data point determination process may be performed, and tokens may be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed may have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, matching engine 212 may determine that the video segment associated with the bin is currently being displayed on client device 202. A video segment may include an entire video program or a portion of the video program. For example, a video segment may be a video program, a scene of a video program, one or more frames of a video program, or any other portion of a video program. An example of a system for identifying media content is described in U.S. patent application Ser. No. 15/240,801, which is hereby incorporated by reference, in its entirety, for all purposes.

Referring back to FIG. 1, a media consuming device of the media consuming devices 110 may also send data to audience segment engine 132 of identity management system 130. The data sent to audience segment engine 132 may include cookies from browsers and Internet Protocol (IP) addresses. The data may also include location data. For example, the location data can be from a global positioning system (GPS) of a mobile device. In another example, the location data can be derived from WiFi signals.

Audience segment engine 132 may process the data to identify one or more media consuming devices that are associated with a particular individual (sometimes referred to as a device map or device graph) and/or assign one or more audience segments (sometimes referred to as categories) to the particular individual (sometimes referred to as the one or more media consuming devices). An audience segment assigned to an individual may indicate that the individual ranks above a threshold for one or more behaviors and/or one or more characteristics that are associated with the audience segment. The particular methodology for generating a device map and/or assigning audience segments may be performed in a number of ways, including that described in U.S. Pat. No. 8,051,444, which is hereby incorporated by reference, in its entirety, for all purposes.

In some examples, after assigning the one or more audience segments, audience segment engine 132 may send a pairing of an identification of the one or more media consuming devices associated with an individual and an identification of the one or more audience segments to targeting system 140 (as illustrated by reference 156). In other examples, audience segment engine 132 may send multiple pairings to targeting system 140 at a time.

Targeting system 140 may correlate data received from each of ACR engine 122 and audience segment engine 132. The correlated data may associate media consuming devices with audience segments and viewing data. For example, a media consuming device may be associated with (1) an audience segment assigned to the media consuming device and (2) viewing data received for the media consuming device. Searches may be performed on the correlated data, as further described below.

In some examples, a search may be performed on an audience segment to output a percentage related to media consuming devices in the audience segment and viewing data related to the media consuming devices. For example, the output may be a percentage that the media consuming devices in the audience segment are more or less likely to view content (e.g., a particular channel, a particular genre of content, a particular segment of content, or the like) than the rest of a population. For another example, the output may be a percentage of media consuming devices (associated with the audience segment) that has viewed content (e.g., a particular channel, a particular genre of content, a particular segment of content, or the like) for at least a particular amount of time.

In other examples, a search may be performed on viewing data to output a percentage of media consuming devices related to the viewing data and one or more audience segments. For example, the output may be a percentage that the media consuming devices in the one or more audience segments are more or less likely to view content included in the viewing data (e.g., tuned to a particular channel for at least a particular amount of time) than the rest of a population. For another example, the output may be a percentage of media consuming devices that have, for at least a particular amount of time, (1) tuned to a particular channel, (2) viewed a particular genre of content, or (3) viewed a particular segment of content) associated with one or more audience segments.

Figure 3A:
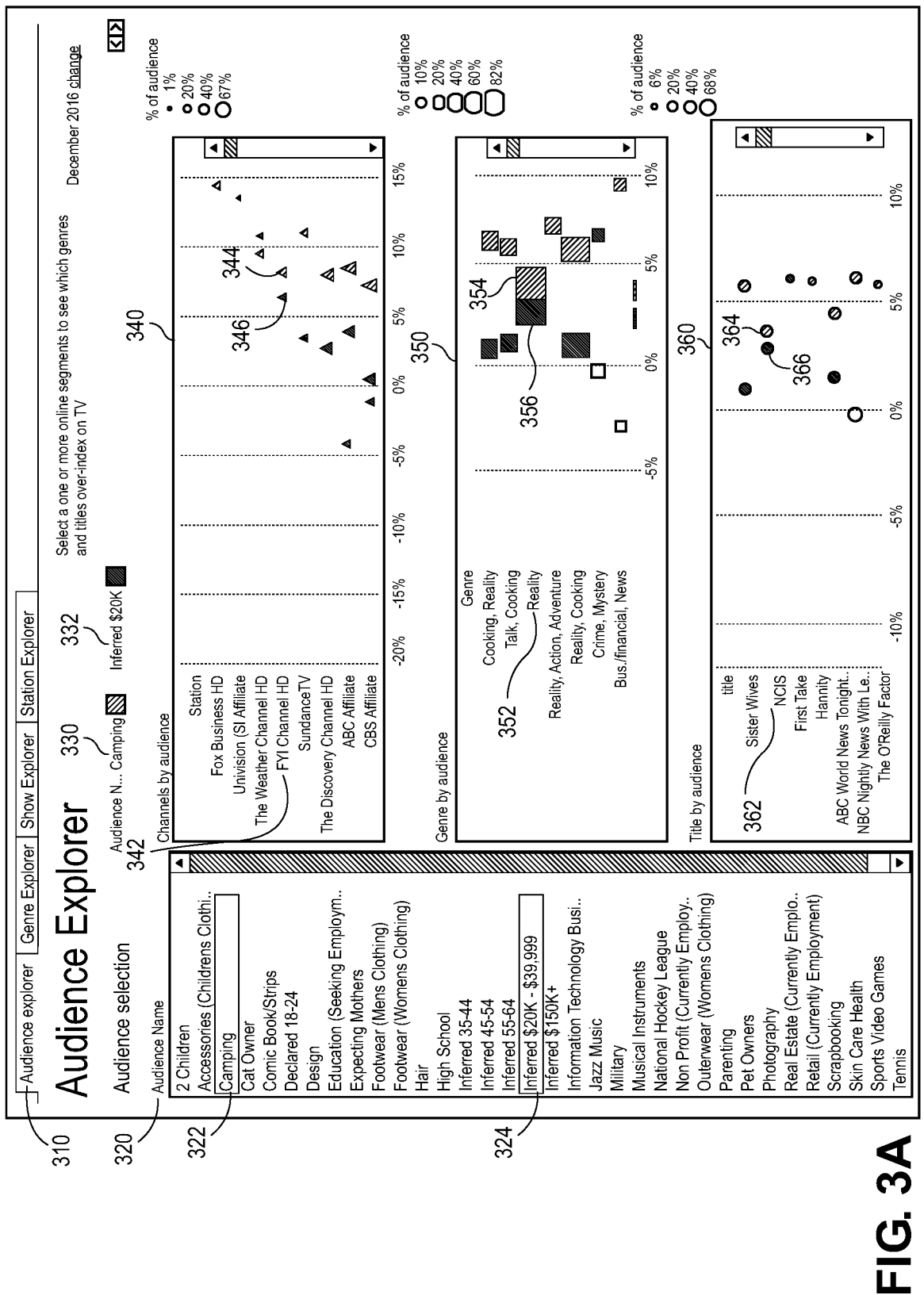
FIG. 3A is an example of a user interface for an audience explorer according to certain embodiments.

FIG. 3A is an example of a user interface for an audience explorer (referred to as audience explorer) according to certain embodiments. In some examples, the audience explorer may be presented when a user selects audience explorer tab 310. In other examples, the audience explorer may be a default starting point such that a user does not need to select a tab.

The audience explorer may allow a user to select one or more audiences in audience selection column 320. The one or more audiences may be those that were output by an identity management system (such as identity management system 130 described above). While FIG. 3A illustrates two audiences selected, it should be recognized that more or less audiences may be selected. It should also be recognized that other formats and methods of selection may be used for selecting audiences, including receiving a list of one or more audiences to be used through an Application Programming Interface (API).

Viewing information may be received for each of the one or more audiences selected. In some examples, the viewing information may be limited to media consuming devices that are included in the one or more audiences. In other examples, the viewing information of all media consuming device may be received. Examples of the viewing information may include (1) stations that each of the media consuming devices have watched for a particular amount of time, (2) genres of video segments that each of the media consuming devices have watched, (3) titles of video segments that each of the media consuming devices have watched, (4) or the like.

Once the viewing information is received, one or more statistics may be determined for the media consuming devices that are included in the one or more audiences. For example, a statistic may indicate a degree that users in a category are to view a particular content stream. The degree may be relative to the rest of a population. For another example, a statistic may be percent of the media consuming devices that are included in an audience that are associated with particular viewing information. It should be recognized that other statistics may be used, including other statistics described herein.

In some examples, different types of statistics may be included in different areas of the user interface. For example, first area 340 may include statistics related to channels by audience, second area 350 may include statistics related to genres by audience, and third area 360 may include statistics related to titles by audience, each of which is further descried below.

First area 340 may include a graph with the statistics related to channels by audience. The statistics may be associated with media consuming devices that are included in a first audience (e.g., camping, as indicated by reference 322) and have watched a particular station (e.g., FYI Channel HD, as indicated by reference 342). For example, first area 340 includes a first statistic (as indicated by indicator 344) that is approximately 8%. The 8% may represent a percent that users in the camping audience are more or less likely to view FYI Channel HD than the rest of a population. In some examples, a size of indicator 344 may correspond to a percent of the camping audience watched FYI Channel HD. While particular statistics and particular visual appearances have been described here, it should be recognized that other statistics and/or other visual appearances may be used.

The graph in first area 340 also includes statistics associated with media consuming devices that are included in a second audience (e.g., Inferred $20 k-$39,999, as indicated by reference 324). For example, first area 340 includes a second statistic (as indicated by indicator 346) that is approximately 6%. The 6% may represent a percent that users in the Inferred $20 k-$39,999 audience are more or less likely to view FYI Channel HD than the rest of a population. In some examples, a size of indicator 346 may correspond to a percent of the Inferred $20 k-$39,999 audience watched FYI Channel HD. While particular statistics and particular visual appearances have been described here, it should be recognized that other statistics and/or other visual appearances may be used.

By having indicator 344 and indicator 346 in the graph in first area 340, a user may easily see which audience watches more of a particular channel. Using this information, the user may cause particular content to be displayed on the particular channel. The particular content may be targeted toward an audience that watches more of the channel.

Second area 350 may include a graph with the statistics related to genres by audience. The statistics may be associated with media consuming devices that are included in a first audience (e.g., camping, as indicated by reference 322) and have watched a particular genre (e.g., reality, as indicated by reference 352). For example, second area 350 includes a first statistic (as indicated by indicator 354) that is approximately 4%. The 4% may represent a percent that users in the camping audience are more or less likely to view reality genre than the rest of a population. In some examples, a size of indicator 354 may correspond to a percent of the camping audience that watched reality genre. While particular statistics and particular visual appearances have been described here, it should be recognized that other statistics and/or other visual appearances may be used.

The graph in second area 350 also includes statistics associated with media consuming devices that are included in a second audience (e.g., Inferred $20 k-$39,999, as indicated by reference 324). For example, second area 350 includes a second statistic (as indicated by indicator 356) that is approximately 3%. The 3% may represent a percent that users in the Inferred $20 k-$39,999 audience are more or less likely to view reality genre than the rest of a population. In some examples, a size of indicator 356 may correspond to a percent of the Inferred $20 k-$39,999 audience that watched reality genre. While particular statistics and particular visual appearances have been described here, it should be recognized that other statistics and/or other visual appearances may be used.

By having indicator 354 and indicator 356 in the graph in second area 350, a user may easily see which audience watches more of a particular channel. Using this information, the user may cause particular content to be displayed on the particular channel. The particular content may be targeted toward an audience that watches more of the channel.

Third area 360 may include a graph with the statistics related to titles by audience. The statistics may be associated with media consuming devices that are included in a first audience (e.g., camping, as indicated by reference 322) and have watched a particular media segment (e.g., NCIS, as indicated by reference 362). For example, third area 360 includes a first statistic (as indicated by indicator 364) that is approximately 4%. The 4% may represent a percent that users in the camping audience are more or less likely to view NCIS than the rest of a population. In some examples, a size of indicator 364 may correspond to a percent of the camping audience that watched NCIS. While particular statistics and particular visual appearances have been described here, it should be recognized that other statistics and/or other visual appearances may be used.

The graph in third area 360 also includes statistics associated with media consuming devices that are included in a second audience (e.g., Inferred $20 k-$39,999, as indicated by reference 324). For example, third area 360 includes a second statistic (as indicated by indicator 366) that is approximately 3%. The 3% may represent a percent that users in the Inferred $20 k-$39,999 audience are more or less likely to view NCIS than the rest of a population. In some examples, a size of indicator 366 may correspond to a percent of the Inferred $20 k-$39,999 audience that watched NCIS. While particular statistics and particular visual appearances have been described here, it should be recognized that other statistics and/or other visual appearances may be used.

By having indicator 364 and indicator 366 in the graph in third area 360, a user may easily see which audience watches more of a particular channel. Using this information, the user may cause particular content to be displayed on the particular channel. The particular content may be targeted toward an audience that watches more of the channel.

While FIG. 3A illustrates a particular number of stations included in the user interface, it should be recognized that more or less stations may be presented. In addition, it should be recognized that the particular way to show percentages may be different than that illustrated in FIG. 3A.

Figure 3B:
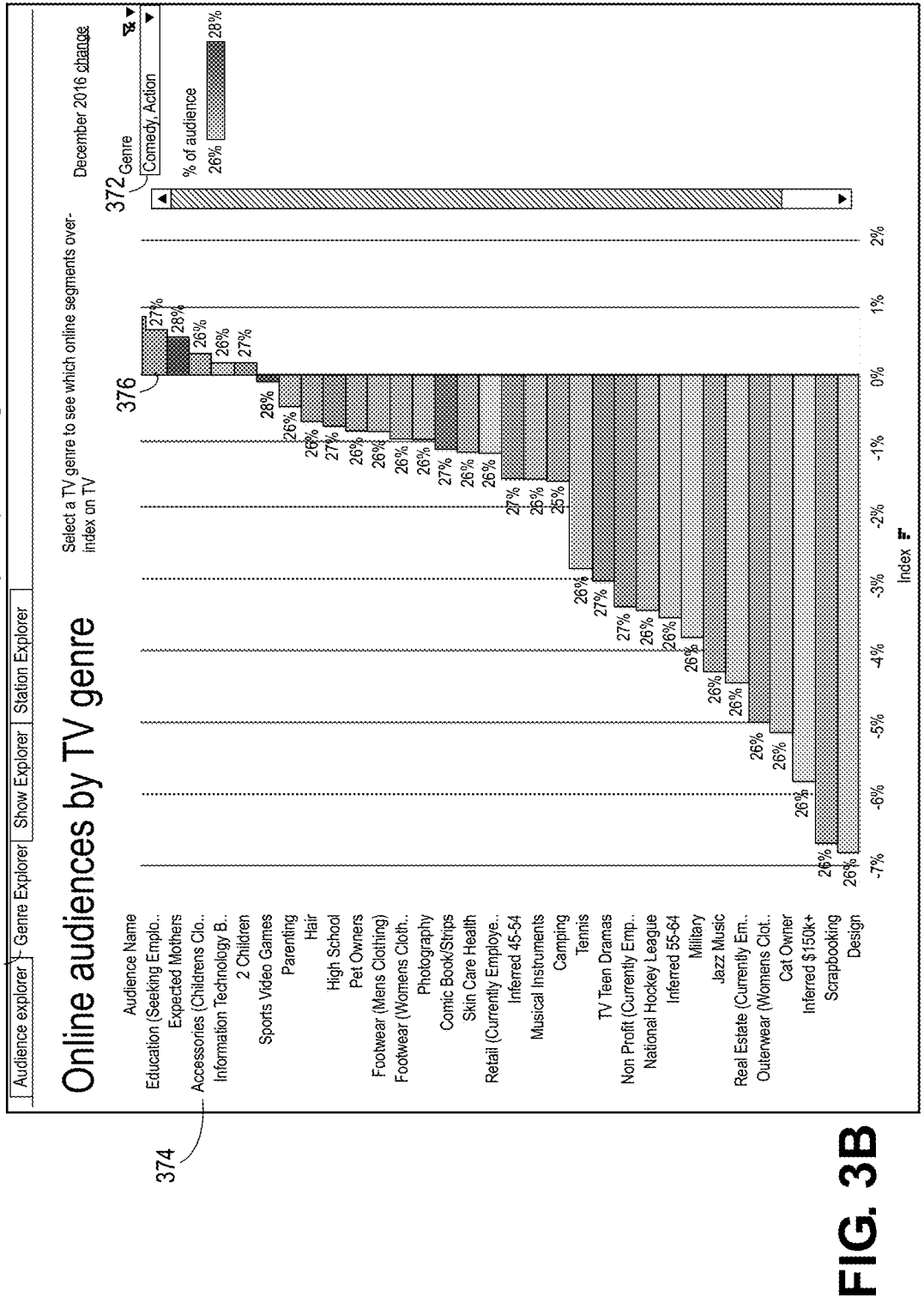
FIG. 3B is an example of a user interface for a genre explorer according to certain embodiments.

FIG. 3B is an example of a user interface for a genre explorer according to certain embodiments. In some examples, the genre explorer may be presented when a user selects genre explorer tab 370. In other examples, the genre explorer may be a default starting point, such that a user does not need to select a tab.

The genre explorer may allow a user to select a genre segment using genre selection box 372. In some implementations, a list of different genres may be those that were output by an ACR system (such as ACR system 120 described above). It should be recognized that other formats and methods of selection may be used for selecting genres. For example, in some cases, a list of one or more genres to be used can be received through an Application Programming Interface (API).

Viewing information may be received for the genre selected. In some examples, the viewing information may include media consuming devices that watched a media conforming to the genre. In other examples, the viewing information of all media consuming device may be received. In addition to the viewing information, one or more audiences that include those media consuming devices that watched media of the selected genre may be identified. The one or more audiences may be those that were output by an identity management system (such as identity management system 130 described above).

Once the viewing information and the one or more audiences 374 are identified, one or more statistics may be determined for the media consuming devices that are included in each of the one or more audiences. In one illustrative example, a statistic can include an indication of a degree that users in an audience are determined to view the media of the genre (e.g., as indicated by the length of bars in FIG. 3B, such as bar 376). The degree may be relative to the rest of a population, such as a percent that a user in an audience is either more or less likely to view media of the genre than users in the rest of a population. As another illustrative example, a statistic can include a percentage of the media consuming devices that are included in an audience that viewed media of the genre (e.g., as indicated by the color of bars in FIG. 3B, such as bar 376). It should be recognized that other statistics may be used, including other statistics described herein or other suitable statistics.

While FIG. 3B illustrates a particular number of audiences included in the user interface, it should be recognized that more or less audiences may be presented. In addition, it should be recognized that the particular way to show percentages may be different than that illustrated in FIG. 3B.

Figure 3C:
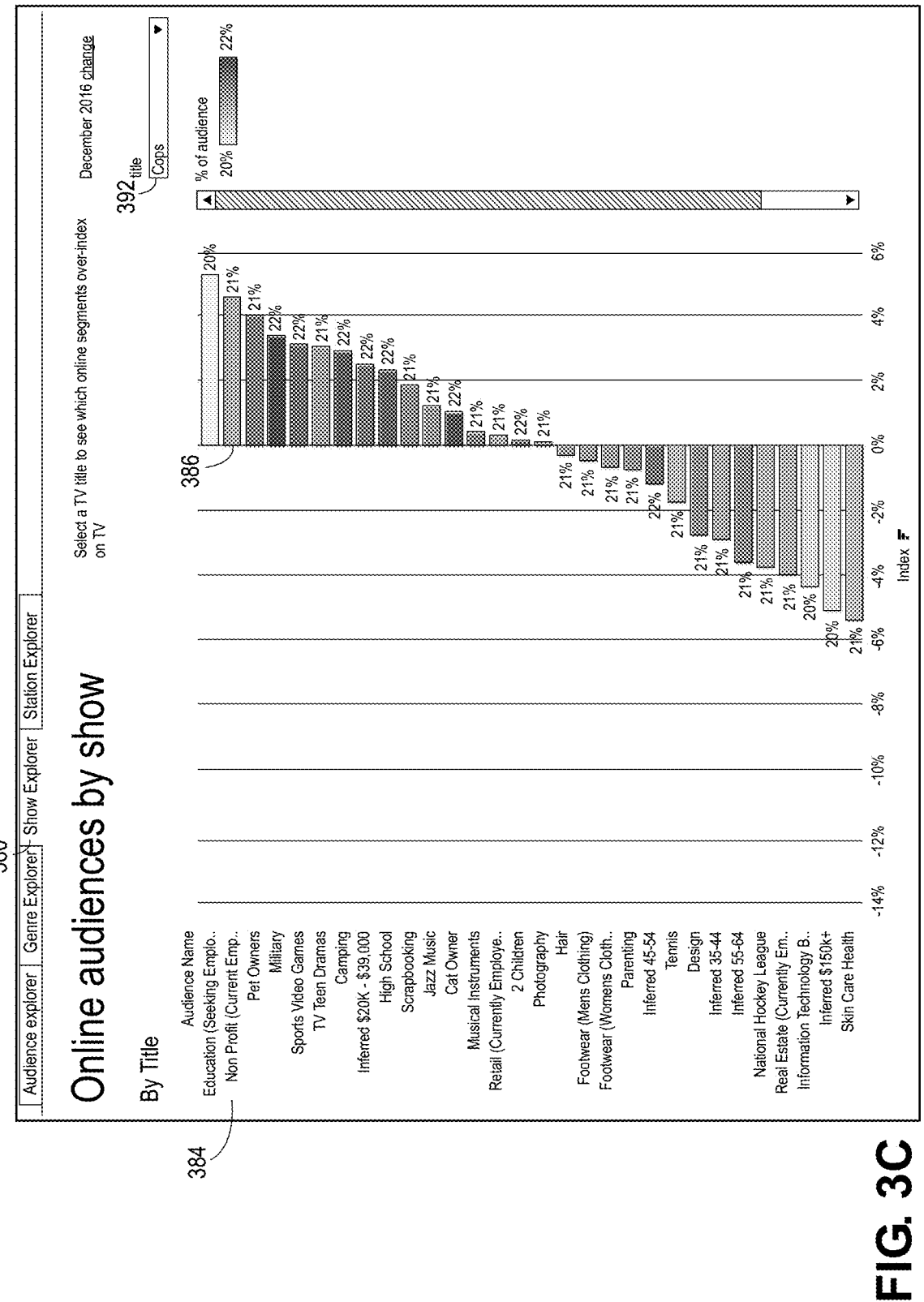
FIG. 3C is an example of a user interface for a show explorer according to certain embodiments.

FIG. 3C is an example of a user interface for a show explorer according to certain embodiments. In some examples, the show explorer may be presented when a user selects show explorer tab 380. In other examples, the show explorer may be a default starting point such that a user does not need to select a tab.

The show explorer may allow a user to select a title of a video segment using title selection box 382. A list of different titles may be those that were output by an ACR system (such as ACR system 120 described above). It should be recognized that other formats and methods of selection may be used for selecting titles, including receiving a list of one or more titles to be used through an Application Programming Interface (API).

Viewing information may be received for the title selected. In some examples, the viewing information may include media consuming devices that watched the title. In other examples, the viewing information of all media consuming device may be received. In addition to the viewing information, one or more audiences that include those media consuming devices that watched the title may be identified. The one or more audiences may be those that were output by an identity management system (such as identity management system 130 described above).

Once the viewing information and the one or more audiences 384 are identified, one or more statistics may be determined for the media consuming devices that are included in each of the one or more audiences. For example, a statistic may indicate a degree that users in an audience are determined to view the title (e.g., as indicated by the length of bars in FIG. 3C, such as bar 386). The degree may be relative to the rest of a population, such as a percent that a user in an audience is either more or less likely to view the title than users in the rest of a population. For another example, a statistic may be percent of the media consuming devices that are included in an audience that viewed the title (e.g., as indicated by the color of bars in FIG. 3C, such as bar 386). It should be recognized that other statistics may be used, including other statistics described herein.

While FIG. 3C illustrates a particular number of audiences included in the user interface, it should be recognized that more or less audiences may be presented. In addition, it should be recognized that the particular way to show percentages may be different than that illustrated in FIG. 3C.

Figure 3D:
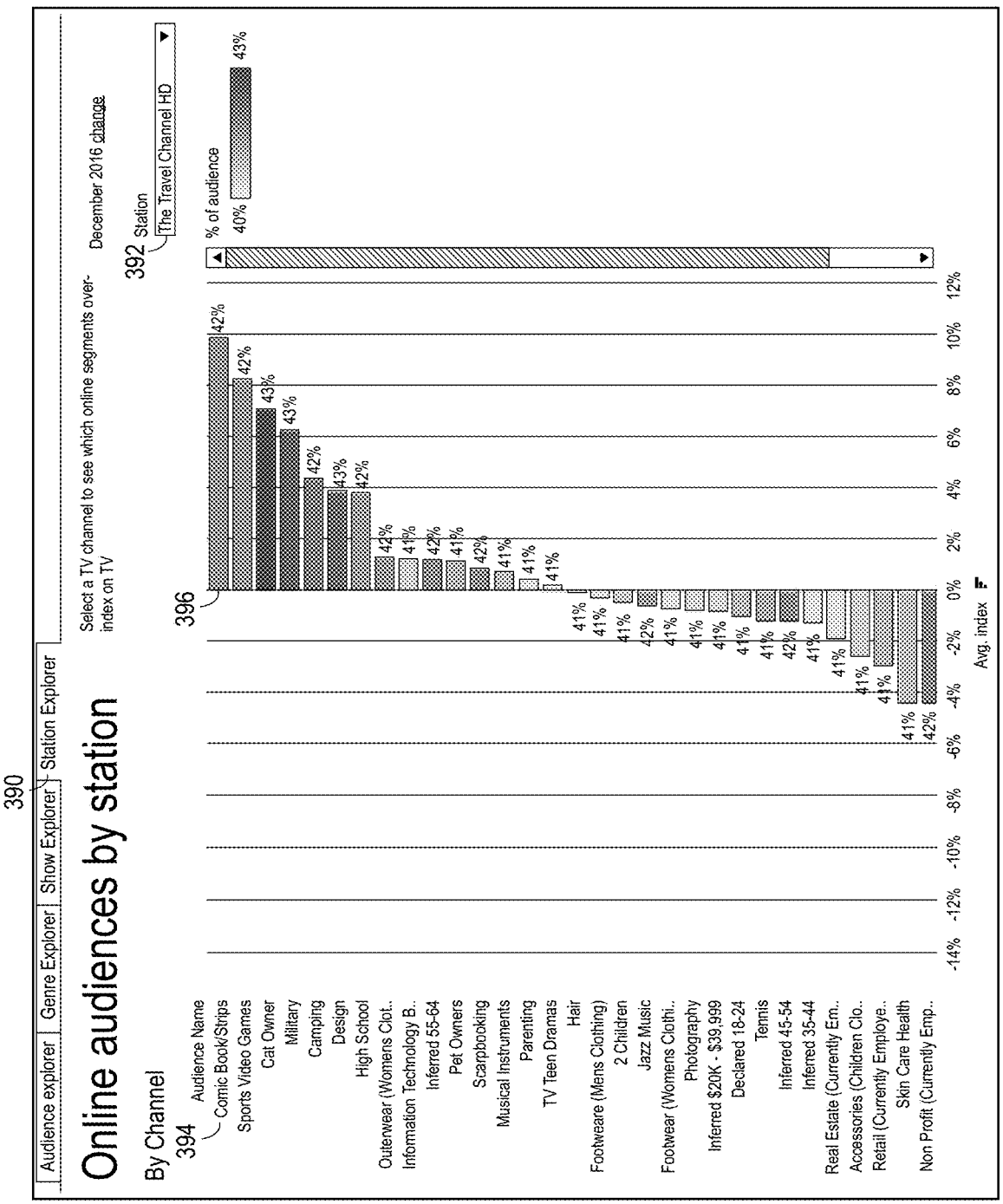
FIG. 3D is an example of a user interface for a station explorer according to certain embodiments.

FIG. 3D is an example of a user interface for a station explorer according to certain embodiments. In some examples, the station explorer may be presented when a user selects station explorer tab 390. In other examples, the station explorer may be a default starting point such that a user does not need to select a tab.

The station explorer may allow a user to select a video segment stream (sometimes referred to as a station or a channel) using stream selection box 392. A list of different video segment streams may be those that a media consuming device may view. It should be recognized that other formats and methods of selection may be used for selecting streams, including receiving a list of one or more streams to be used through an Application Programming Interface (API).

Viewing information may be received for the stream selected. In some examples, the viewing information may include media consuming devices that were determined to watch the stream. In other examples, the viewing information of all media consuming device may be received. In addition to the viewing information, one or more audiences that include those media consuming devices that that were determined to watch the stream may be identified. The one or more audiences may be those that were output by an identity management system (such as identity management system 130 described above).

Once the viewing information and the one or more audiences are identified, one or more statistics may be determined for the media consuming devices that are included in each of the one or more audiences. For example, a statistic may indicate a degree that users in an audience are determined to watch the stream (e.g., as indicated by the length of bars in FIG. 3D, such as bar 396). The degree may be relative to the rest of a population, such as a percent that a user in an audience is either more or less likely to view the stream than users in the rest of a population. For another example, a statistic may be percent of the media consuming devices that are included in an audience that watch the stream (e.g., as indicated by the color of bars in FIG. 3D, such as bar 396). It should be recognized that other statistics may be used, including other statistics described herein.

While FIG. 3D illustrates a particular number of audiences included in the user interface, it should be recognized that more or less audiences may be presented. In addition, it should be recognized that the particular way to show percentages may be different than that illustrated in FIG. 3D.

Figure 4A:
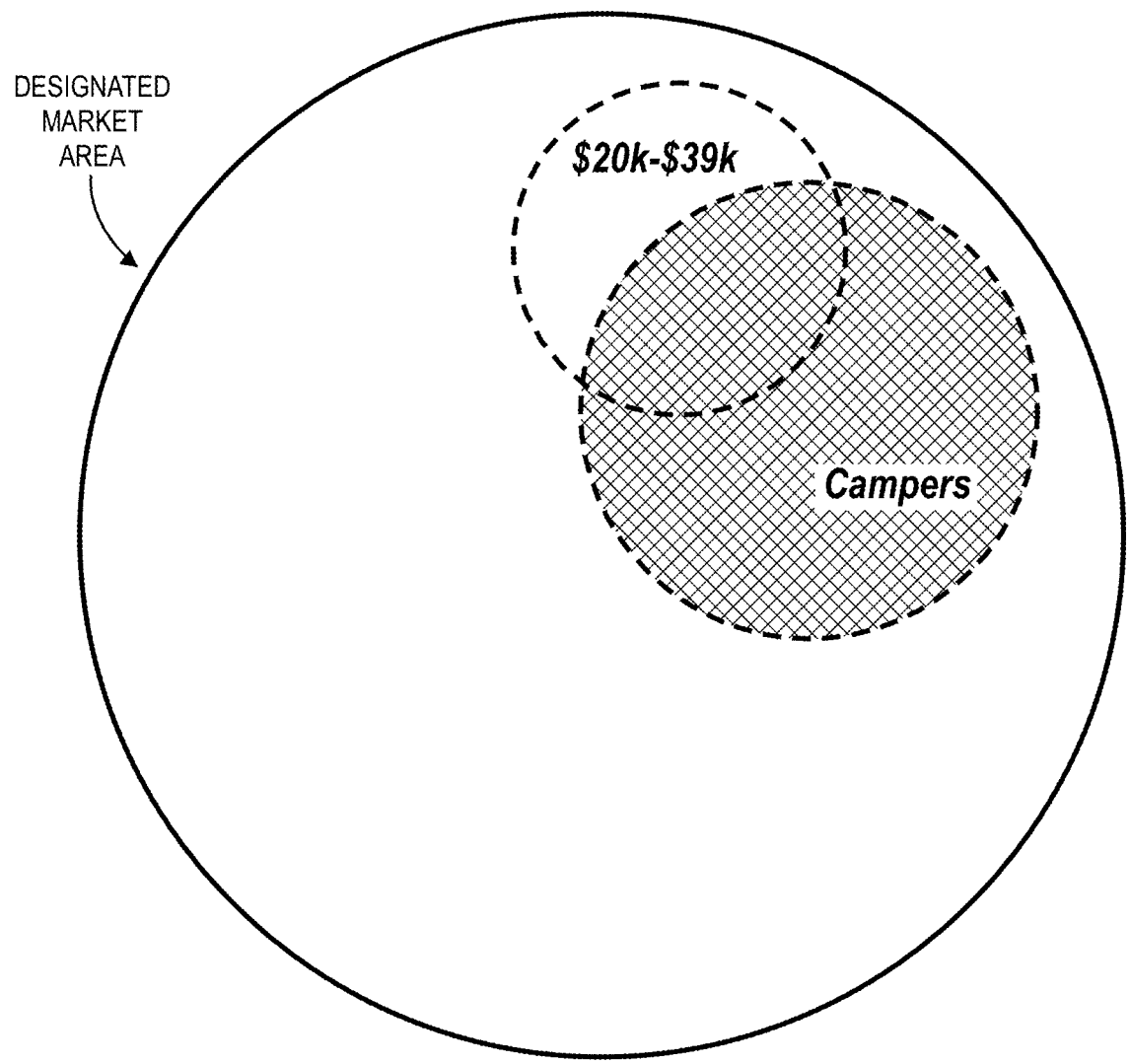
FIG. 4A is a graphical depiction of a designated market area including multiple categories for user devices according to certain embodiments.

FIG. 4A is a graphical depiction of a designated market area including multiple categories for user devices according to certain embodiments. The graphical depiction is in the form of a Venn diagram. The Venn diagram indicates (1) a set of viewers in the designated market area that are determined to enjoy camping and (2) a set of viewers in the designated market area that have a certain income range. The Venn diagram also indicates a set of viewers in the designated market area that are determined to both enjoy camping and have the certain income range (e.g., the intersecting portion). As shown in FIG. 4A, a larger portion of the designated market area are determined to enjoy camping than have an income range of $20,000-39,000. An even smaller portion of the designated market area is determined to both enjoy camping and also have an income range of $20,000-39,000. This portion of the designated market area is illustrated as the portion of the designated market area enjoying camping that overlaps with the designated market area having that particular income range.

Figure 4B:
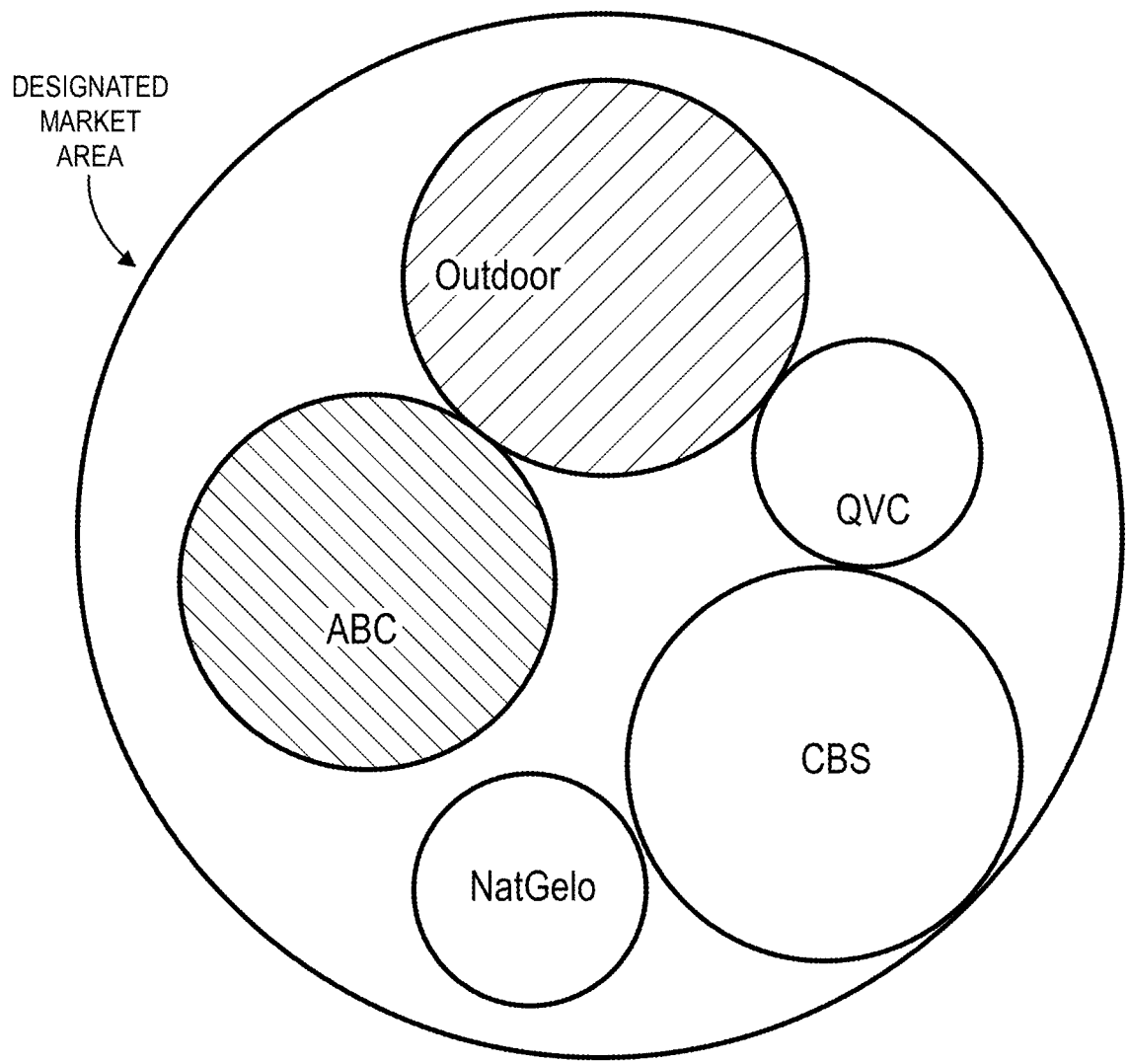
FIG. 4B is a graphical depiction of a designated market area including multiple channels that user devices may present according to certain embodiments.

A more detailed Venn diagram is seen in FIG. 4B of the same example designated market area as shown in FIG. 4A. As shown in FIG. 4B, multiple channels are depicted that user devices may present according to certain embodiments. The size of the circles may represent the portion of the designated market area that viewed these channels at a given time. In this example, approximately the same number of people viewed Outdoor, ABC, and CBS, with a lesser number of people viewing QVC and NatGeo. Because only one channel can be viewed on each user device at a given time, the Venn diagram shown in FIG. 4B does not have overlapping circles. However, it is contemplated that user devices may exist that are capable of viewing multiple channels at a given time, and in those situations, circles may overlap.

Figure 4C:
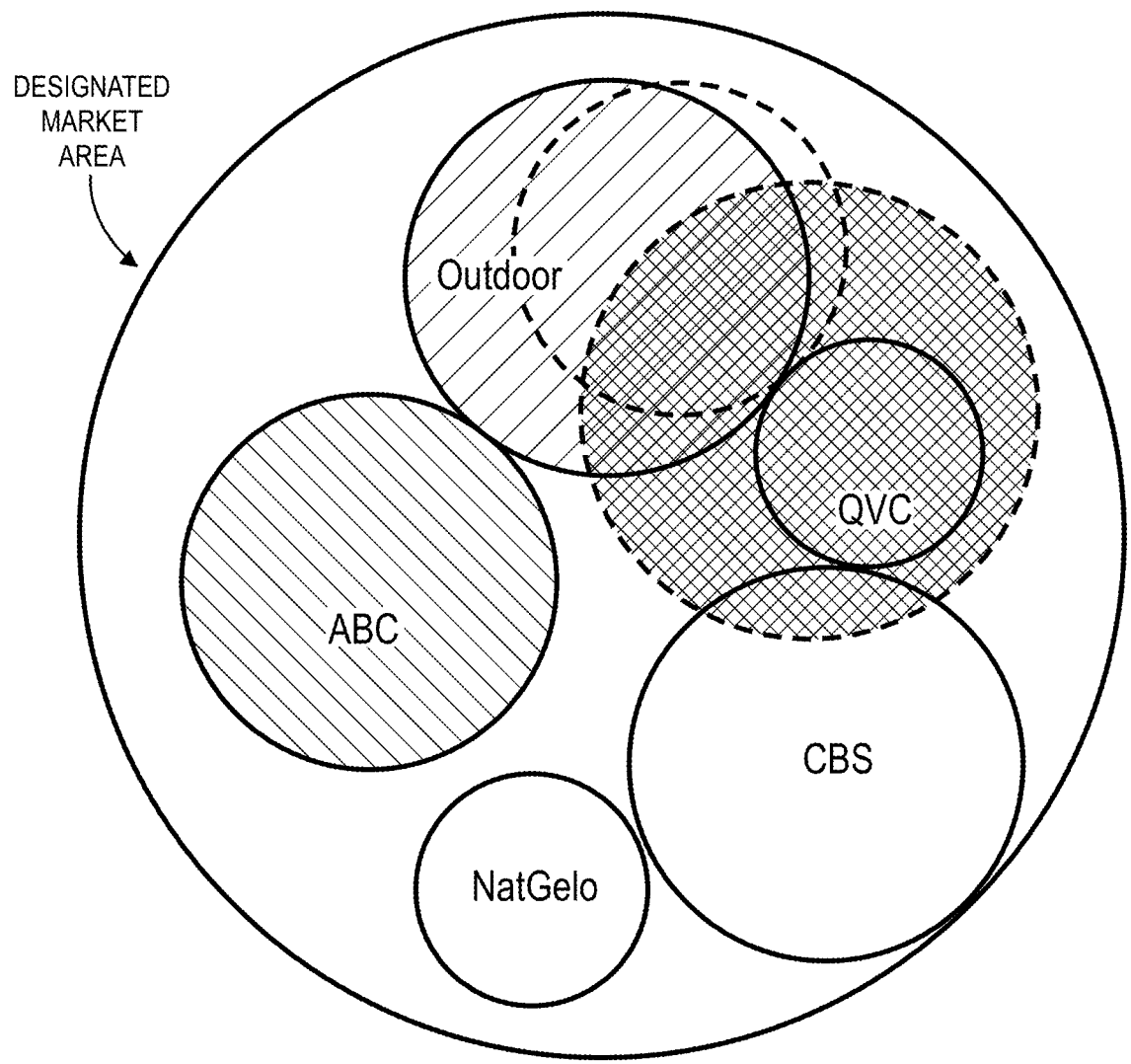
FIG. 4C is a graphical depiction of a designated market area including both multiple categories for user devices and multiple channels that user devices may present according to certain embodiments.

FIG. 4C is a graphical depiction of a designated market area including both multiple categories for user devices and multiple channels that user devices may present according to certain embodiments. In particular, the data from FIG. 4A has been overlaid on FIG. 4B to assist a user in understanding how a sponsor-targeted intersection of camping enthusiasts of a certain income bracket falls within available channels where commercial time may be purchased. As shown in FIG. 4C, the intersection of the designated market area that enjoys camping with the designated market area that has a $20,000-39,000 salary falls primarily within the designated market area that watches the Outdoor channel. Thus, an advertiser seeking to obtain commercial time targeting those that enjoy camping and having an income bracket of $20,000-39,000 may seek to advertise on the Outdoor channel.

Figure 4D:
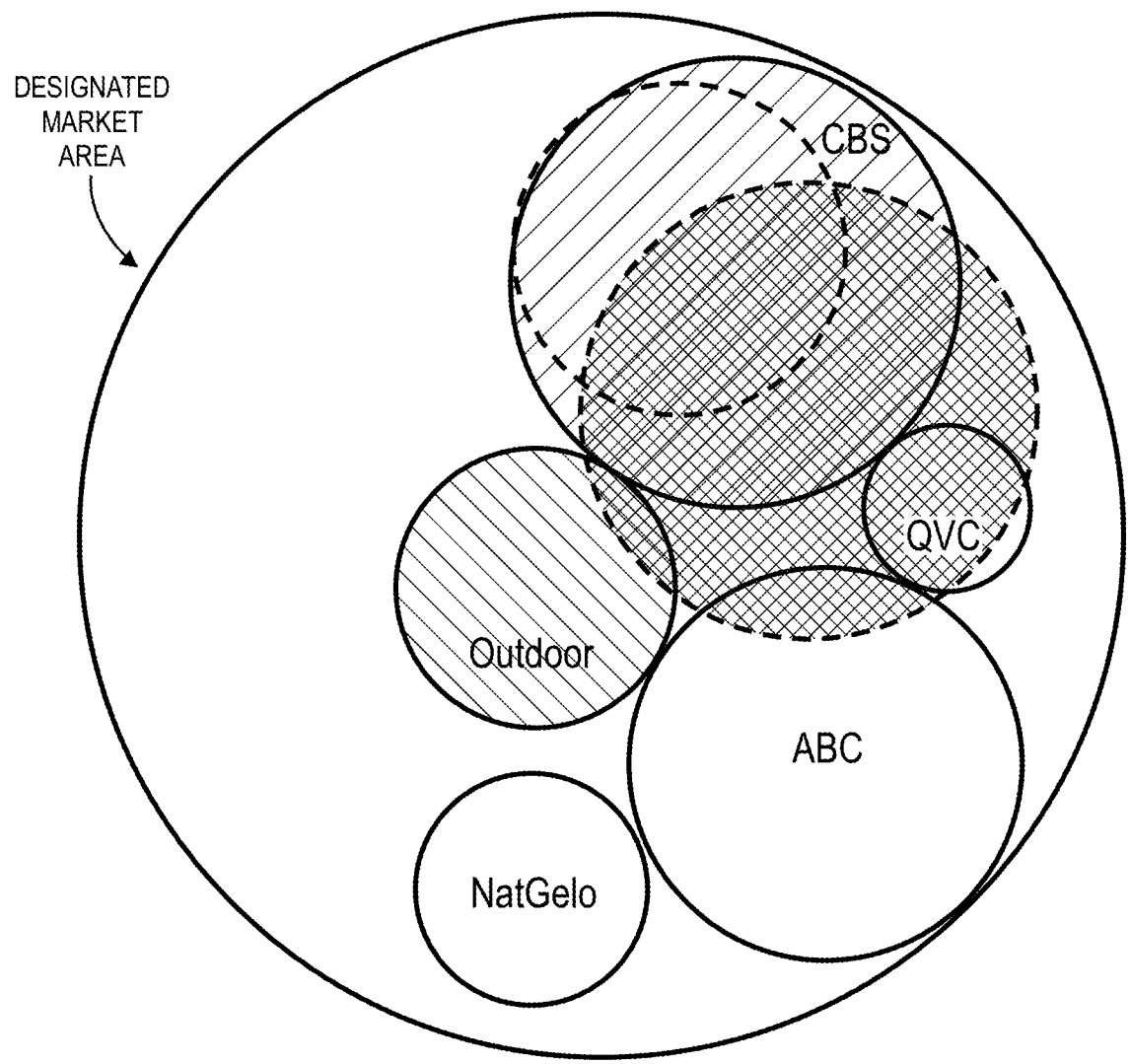
FIG. 4D is a graphical depiction of another designated market area including both multiple categories for user devices and multiple channels that user devices may present according to certain embodiments.

FIG. 4D is a graphical depiction of another designated market area including both multiple categories for user devices and multiple channels that user devices may present according to certain embodiments. The data presented in FIG. 4D may be similar data as that shown previously in FIGS. 4A-4C, but with data derived during a different day part. As shown in FIG. 4D, during a different day part, the portion of the designated market area that enjoys camping and has an income of $20,000-39,000 may instead fall primarily within those that watch CBS. Thus, during that day part, an advertiser seeking to obtain commercial time targeting that group may seek to advertise on CBS.

Figure 5:
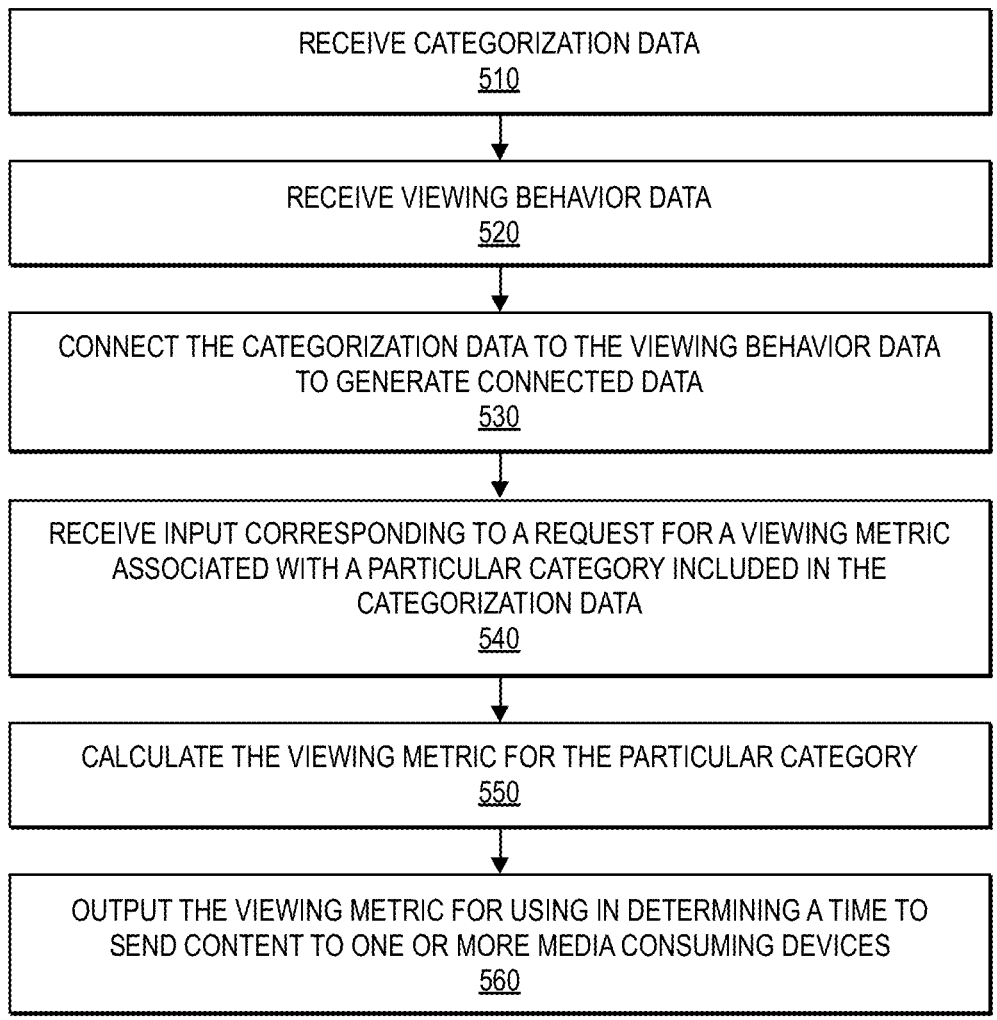
FIG. 5 is a simplified flowchart depicting processing performed to output a viewing metric for use in determining a time to send content to one or more media consuming devices according to certain embodiments.

FIG. 5 is a simplified flowchart depicting processing performed to output a viewing metric for use in determining a time to send content to one or more media consuming devices according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain embodiments, the steps may be performed in some different order or some steps may also be performed in parallel.

In the embodiment depicted in FIG. 5, the processing may be triggered at 510 when categorization data is received. The categorization data may include a plurality of sets, where a set includes a category and a group of one or more media consuming devices assigned to the category. For example, a set for camping may include an identifier indicating "camping" paired with a list of identification information for one or more devices that have been assigned to the "camping" category.

In some examples, a first set of the plurality of sets includes a first media consuming device and a second set of the plurality of sets includes a second media consuming device. In such examples, the first media consuming device may be a different device than the second media consuming device such that there is at least one different device in the first set as compared to the second set. In other examples, the first set and the second set may include all of the same devices.

At 520, viewing behavior data may be received. The viewing behavior data may identify media content presented by a media consuming device associated with a set of the plurality of sets. For example, an example of viewing behavior data is a pairing of a media consuming device with an identification of one or more video segments that the media consuming device has watched. The viewing behavior data may be determined by matching unidentified media content viewed by a media consuming device with identified media content.

The matching may occur remote from the media consuming device.

At 530, the categorization data may be connected to the viewing behavior data to generate connected data. Connecting the data may include identifying a first media consuming device included in the categorization data, identifying a second media consuming device included in the viewing behavior data, determining that the first media consuming device is the second media consuming device, and associating data in the categorization data that is related to the first media consuming device with data in the viewing behavior data that is related to the second media consuming device. By associating the data together, information from either the categorization data or the viewing behavior data may be accessed relative to a particular media consuming device.

At 540, input may be received. The input may correspond to a request for a viewing metric associated with a particular category included in the categorization data. The particular category may have been connected to particular viewing behavior data. The request for the viewing metric may be associated with a plurality of categories included in the categorization data.

In some examples, the processing performed in FIG. 5 may further include receiving a second input corresponding to a request for a viewing metric associated with a second category included in the categorization data. The second category may have been connected with second particular viewing behavior data. In such examples, the process performed in FIG. 5 may further include updating the viewing metric. The updating may use the connected data and the second particular viewing behavior data, where the updating is performed in real-time in response to receiving the second input. In such examples, the process performed in FIG. 5 may further include outputting the updated viewing metric for use in determining a time to send content to one or more media consuming devices.

At 550, the viewing metric may be calculated for the particular category. Calculating may include using the particular viewing behavior data. In some examples, calculating the viewing metric is based on time spent by media consuming devices in the particular category watching one or more video segments, time spent by media consuming devices watching the one or more video segments, or a number of media consuming devices that watched the one or more video segments. In some examples, the viewing metric is a channel that is most watched by one or more data consuming devices in the particular category, a video segment that is most watched by one or more data consuming devices in the particular category, or a time channel pair that is most watched by one or more data consuming devices in the particular category.

In some examples, the processing performed in FIG. 5 may further include receiving interaction data. The interaction data may indicate an interaction with a website by a data consuming device included in the categorization data. In such examples, the viewing behavior data used to generate the connected data may be based on the data consuming device with a particular interaction with the website. In some examples, the data consuming device may be a media consuming device.

At 560, the viewing metric may be output for use in determining a time to send content to one or more media consuming devices. For example, output may include presenting the viewing metric in a graphical user interface as illustrated above. For another example, output may include sending the viewing metric to another system, where the other system utilizes the viewing metric when causing an action to be performed, such as reserving the time on one or more networks.

Figure 6:
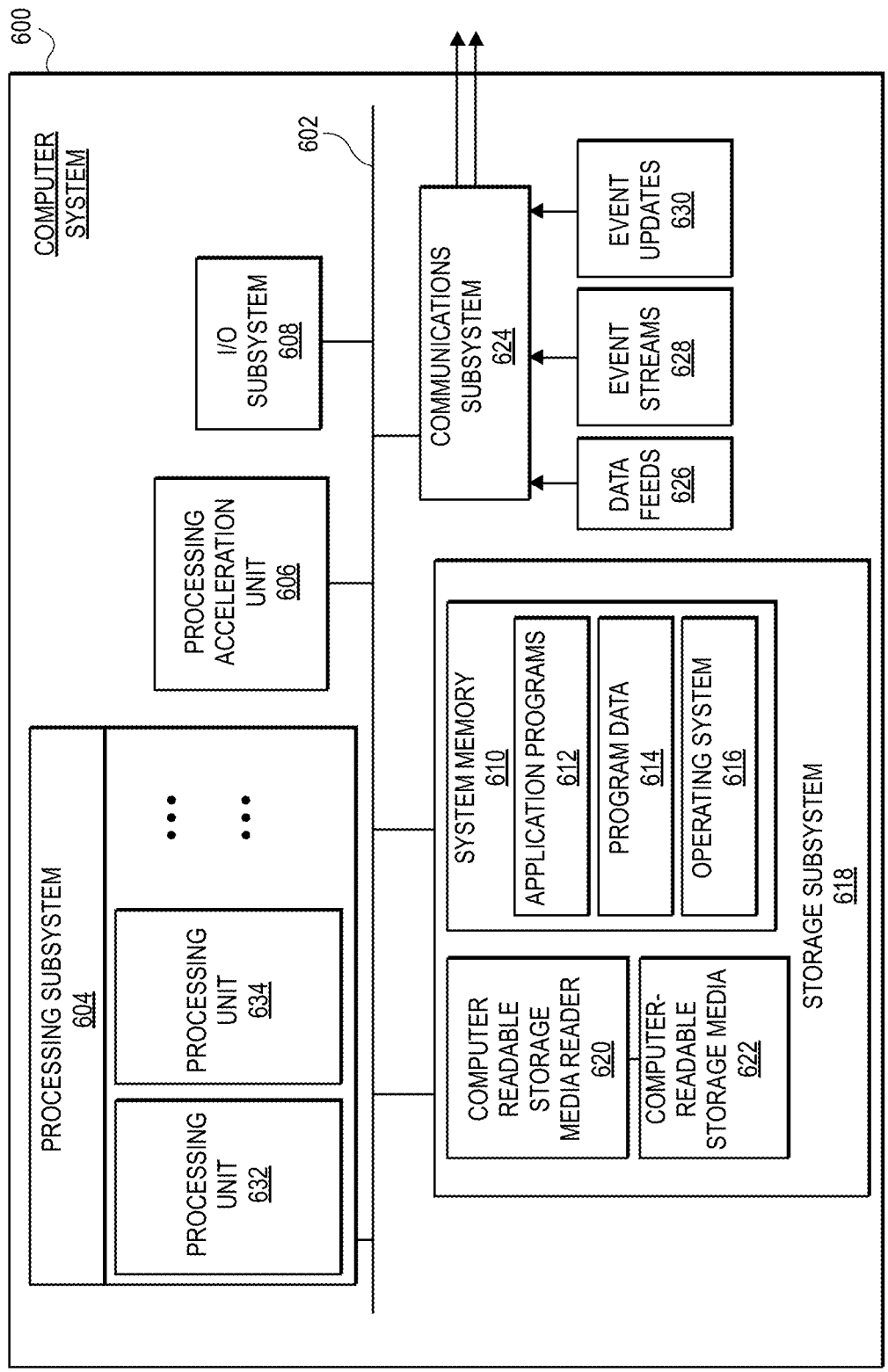
FIG. 6 is a simplified block diagram of a computer system that may be used to implement certain embodiments described herein.

FIG. 6 illustrates an example of computer system 600, which may be used to implement certain embodiments described herein. For example, in some embodiments, computer system 600 may be used to implement any of the systems, servers, devices, or the like described above. As shown in FIG. 6, computer system 600 includes processing subsystem 604, which communicates with a number of other subsystems via bus subsystem 602. These other subsystems may include processing acceleration unit 606, I/O subsystem 608, storage subsystem 618, and communications subsystem 624. Storage subsystem 618 may include non-transitory computer-readable storage media including storage media 622 and system memory 610.

Bus subsystem 602 provides a mechanism for allowing the various components and subsystems of computer system 600 to communicate with each other. Although bus subsystem 602 is shown schematically as a single bus, alternative embodiments of bus subsystem 602 may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include single core and/or multicore processors. The processing resources of computer system 600 may be organized into one or more processing units 632, 634, etc. A processing unit may include one or more processors, one or more cores from the same or different processors, a combination of cores and processors, or other combinations of cores and processors. In some embodiments, processing subsystem 604 may include one or more special purpose co-processors such as graphics processors, digital signal processors (DSPs), or the like. In some embodiments, some or all of the processing units of processing subsystem 604 may be implemented using customized circuits, such as application specific integrated circuits (ASICs), or field programmable gate arrays (FPGAs).

In some embodiments, the processing units in processing subsystem 604 may execute instructions stored in system memory 610 or on computer readable storage media 622. In various embodiments, the processing units may execute a variety of programs or code instructions and may maintain multiple concurrently executing programs or processes. At any given time, some or all of the program code to be executed may be resident in system memory 610 and/or on computer-readable storage media 622 including potentially on one or more storage devices. Through suitable programming, processing subsystem 604 may provide various functionalities described above. In instances where computer system 600 is executing one or more virtual machines, one or more processing units may be allocated to each virtual machine.

In certain embodiments, processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 600 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some embodiments. Storage subsystem 618 may store software (e.g., programs, code modules, instructions) that, when executed by processing subsystem 604, provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes system memory 610 and computer-readable storage media 622. System memory 610 may include a number of memories, including (1) a volatile main random access memory (RAM) for storage of instructions and data during program execution and (2) a non-volatile read only memory (ROM) or flash memory in which fixed instructions are stored. In some implementations, a basic input/output system (BIOS), including the basic routines that help to transfer information between elements within computer system 600, such as during start-up, may typically be stored in the ROM. The RAM typically includes data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and operating system 616.

Computer-readable storage media 622 may store programming and data constructs that provide the functionality of some embodiments. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 618 may also include computer-readable storage media reader 620 that may further be connected to computer-readable storage media 622. Reader 620 may receive and be configured to read data from a memory device such as a disk, a flash drive, etc.

In certain embodiments, computer system 600 may support virtualization technologies, including but not limited to virtualization of processing and memory resources. For example, computer system 600 may provide support for executing one or more virtual machines. In certain embodiments, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 624 may provide wired network connectivity (e.g., Ethernet) in addition to or instead of a wireless interface.

Communication subsystem 624 may receive and transmit data in various forms. For example, in some embodiments, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as web feeds and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 may be one of various types, including a handheld portable device, a wearable device, a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. A method comprising:
  receiving categorization data, wherein the categorization data includes a plurality of sets, wherein a set includes a category and one or more media consuming devices assigned to the category;

receiving viewing behavior data, wherein the viewing behavior data identifies media content presented by a media consuming device associated with a set of the plurality of sets;

outputting for display a plurality of selectable graphical elements, each selectable graphical element of the plurality of selectable graphical elements being associated with a category included in the categorization data;

receiving input corresponding to a selection of a graphical element of the plurality of selectable graphical elements, the graphical element being associated with a particular category included in the categorization data, and wherein the particular category is associated with particular viewing behavior data;

calculating, using the particular viewing behavior data, a viewing metric associated with the particular category associated with the graphical element of the plurality of selectable graphical elements; and in response to the input, outputting for display the viewing metric associated with the particular category for use in determining a time to send content to one or more media consuming devices.

2. The method of claim 1, wherein calculating the viewing metric is based on time spent by media consuming devices in the particular category watching one or more video segments, time spent by media consuming devices watching the one or more video segments, or a number of media consuming devices that watched the one or more video segments.

3. The method of claim 1, wherein the viewing behavior data is determined by matching unidentified media content viewed by a media consuming device with identified media content.

4. The method of claim 1, wherein a first set of the plurality of sets includes a first media consuming device, wherein a second set of the plurality of sets includes a second media consuming device, wherein the first media consuming device is a different device than the second media consuming device.

5. The method of claim 1, wherein the viewing metric associated with the particular category is a channel that is most watched by one or more data consuming devices in the particular category, a video segment that is most watched by one or more data consuming devices in the particular category, or a time channel pair that is most watched by one or more data consuming devices in the particular category.

6. The method of claim 1, further comprising:

receiving interaction data, wherein the interaction data indicates an interaction with a website by a data consuming device included in the categorization data, wherein the viewing behavior data associated with the particular category is based on the data consuming device with a particular interaction with the website.

7. The method of claim 6, wherein the data consuming device is a media consuming device.

8. The method of claim 1, further comprising:

receiving a second input corresponding to selection of a second graphical element of the plurality of selectable graphical elements, the second graphical element being associated with a second category included in the categorization data, wherein the second category has been associated with second particular viewing behavior data;

updating the viewing metric, wherein the updating uses the second particular viewing behavior data, and wherein the updating is performed in real time in response to receiving the second input; and outputting for display the updated viewing metric associated with the particular category and the second category for use in determining a time to send content to one or more media consuming devices.

9. The method of claim 1, wherein the viewing metric associated with the particular category is further associated with a second category.

10. A computer-program product tangibly embodied in a non-transitory machine-readable storage medium, including instructions that, when executed by the one or more processors, cause the one or more processors to:

receive categorization data, wherein the categorization data includes a plurality of sets, wherein a set includes a category and one or more media consuming devices assigned to the category;

receive viewing behavior data, wherein the viewing behavior data identifies media content presented by a media consuming device associated with a set of the plurality of sets;

output for display a plurality of selectable graphical elements, each selectable graphical element of the plurality of selectable graphical elements being associated with a category included in the categorization data;

receive input corresponding to a selection of a graphical element of the plurality of selectable graphical elements, the graphical element being associated with a particular category included in the categorization data, and wherein the particular category is associated with particular viewing behavior data;

calculate, using the particular viewing behavior data, a viewing metric associated with the particular category associated with the graphical element of the plurality of selectable graphical elements; and in response to the input, output for display the viewing metric associated with the particular category for use in determining a time to send content to one or more media consuming devices.

11. The computer-program product of claim 10, wherein calculating the viewing metric is based on time spent by media consuming devices in the particular category watching one or more video segments, time spent by media consuming devices watching the one or more video segments, or a number of media consuming devices that watched the one or more video segments.

12. The computer-program product of claim 10, wherein the viewing behavior data is determined by matching unidentified media content viewed by a media consuming device with identified media content.

13. The computer-program product of claim 10, wherein a first set of the plurality of sets includes a first media consuming device, wherein a second set of the plurality of sets includes a second media consuming device, wherein the first media consuming device is a different device than the second media consuming device.

14. The computer-program product of claim 10, wherein the viewing metric associated with the particular category is a channel that is most watched by one or more data consuming devices in the particular category, a video segment that is most watched by one or more data consuming devices in the particular category, or a time channel pair that is most watched by one or more data consuming devices in the particular category.

15. The computer-program product of claim 10, further including instructions that, when executed by the one or more processors, cause the one or more processors to:
    receive interaction data, wherein the interaction data indicates an interaction with a website by a data consuming device included in the categorization data, wherein the viewing behavior data associated with the particular category is based on the data consuming device with a particular interaction with the website.

16. The computer-program product of claim 15, wherein the data consuming device is a media consuming device.

17. The computer-program product of claim 10, further including instructions that, when executed by the one or more processors, cause the one or more processors to:
    receive a second input corresponding to selection of a second graphical element of the plurality of selectable graphical elements, the second graphical element being associated with a second category included in the categorization data, wherein the second category has been associated with second particular viewing behavior data;
    update the viewing metric, wherein the updating uses the second particular viewing behavior data, and wherein the updating is performed in real time in response to receiving the second input; and
    output for display the updated viewing metric associated with the particular category and the second category for use in determining a time to send content to one or more media consuming devices.

18. The computer-program product of claim 10, wherein the viewing metric associated with the particular category is further associated with a second category.

19. A system comprising:
    one or more processors; and
    one or more non-transitory machine-readable storage media containing instructions that, when executed on the one or more processors, cause the one or more processors to perform operations including:
        receive categorization data, wherein the categorization data includes a plurality of sets, wherein a set includes a category and one or more media consuming devices assigned to the category;
        receive viewing behavior data, wherein the viewing behavior data identifies media content presented by a media consuming device associated with a set of the plurality of sets;
        output for display a plurality of selectable graphical elements, each selectable graphical element of the plurality of selectable graphical elements being associated with a category included in the categorization data;
        receive input corresponding to a selection of a graphical element of the plurality of selectable graphical elements, the graphical element being associated with a particular category included in the categorization data, and wherein the particular category is associated with particular viewing behavior data;
        calculate, using the particular viewing behavior data, a viewing metric associated with the particular category associated with the graphical element of the plurality of selectable graphical elements; and
        in response to the input, output for display the viewing metric associated with the particular category for use in determining a time to send content to one or more media consuming devices.

20. The system of claim 19, wherein calculating the viewing metric is based on time spent by media consuming devices in the particular category watching one or more video segments, time spent by media consuming devices watching the one or more video segments, or a number of media consuming devices that watched the one or more video segments.

* * * * *